United States Patent
Zameroski et al.

(10) Patent No.: US 10,144,526 B2
(45) Date of Patent: Dec. 4, 2018

(54) TURBOPROP ENGINE ATTACHMENT SYSTEMS AND METHODS

(71) Applicant: LORD Corporation, Cary, NC (US)

(72) Inventors: Daniel C. Zameroski, McKean, PA (US); Gerald P. Whiteford, Waterford, PA (US)

(73) Assignee: LORD Corporation, Cary, NC (US)

( * ) Notice: Subject to any disclaimer, the term of this patent is extended or adjusted under 35 U.S.C. 154(b) by 57 days.

(21) Appl. No.: 15/034,443

(22) PCT Filed: Nov. 18, 2014

(86) PCT No.: PCT/US2014/066140
§ 371 (c)(1),
(2) Date: May 4, 2016

(87) PCT Pub. No.: WO2015/074043
PCT Pub. Date: May 21, 2015

(65) Prior Publication Data
US 2016/0280381 A1  Sep. 29, 2016

Related U.S. Application Data

(60) Provisional application No. 61/905,526, filed on Nov. 18, 2013.

(51) Int. Cl.
*B64D 27/00* (2006.01)
*B64D 27/26* (2006.01)
(Continued)

(52) U.S. Cl.
CPC .............. *B64D 27/26* (2013.01); *B64D 27/10* (2013.01); *F01D 25/04* (2013.01); *F01D 25/28* (2013.01); *G06F 11/3433* (2013.01); *G06F 11/3447* (2013.01); *G06F 11/3466* (2013.01); *B64D 2027/266* (2013.01); *F05D 2220/323* (2013.01); *F05D 2230/60* (2013.01); *F05D 2240/90* (2013.01); *F05D 2260/96* (2013.01); *G06F 11/3409* (2013.01); *G06F 11/3419* (2013.01)

(58) Field of Classification Search
CPC .............. B64D 27/26; B64D 2027/262; B64D 2027/266; F01D 25/04; F01D 25/28
See application file for complete search history.

(56) References Cited

U.S. PATENT DOCUMENTS

| | | |
|---|---|---|
| 2,539,960 A | 1/1951 | Marchant et al. |
| 3,208,217 A | 9/1965 | Gerhard |

(Continued)

OTHER PUBLICATIONS

Pilatus, PC-12 NG—The Other Swiss Movement, http://www.synerjet.com/assets/pc-12-theotherswissmovement.pdf, accessed Nov. 19, 2013, 22 pgs.

*Primary Examiner* — Richard G Davis

(57) ABSTRACT

An engine attachment system (EAS) includes a forward collar (202), an aft collar (204), at least one truss subassembly (216) disposed between the forward collar and the aft collar for supporting an engine, and at least one vibration isolator (206,208) integrated with each of the forward and aft collars for isolating engine vibration and reducing noise. A method of attaching a turboprop engine includes providing an EAS and hoisting a turboprop engine at least partially within the at least one truss subassembly (216).

20 Claims, 9 Drawing Sheets

(51) Int. Cl.
    *G06F 11/34*     (2006.01)
    *B64D 27/10*     (2006.01)
    *F01D 25/04*     (2006.01)
    *F01D 25/28*     (2006.01)

(56) References Cited

U.S. PATENT DOCUMENTS

| | | | | |
|---|---|---|---|---|
| 3,502,287 | A * | 3/1970 | Lindsay | B64D 27/14 244/54 |
| 5,918,833 | A | 7/1999 | Najand et al. | |
| 6,123,293 | A | 9/2000 | Breitbach et al. | |
| 6,126,110 | A | 10/2000 | Seaquist et al. | |
| 7,121,504 | B2 | 10/2006 | Machado et al. | |
| 7,159,819 | B2 | 1/2007 | Machado et al. | |
| 7,296,768 | B2 | 11/2007 | Machado et al. | |
| 7,350,747 | B2 | 4/2008 | Machado et al. | |
| 7,451,947 | B2 | 11/2008 | Machado et al. | |
| 7,971,825 | B2 | 7/2011 | Diochon et al. | |
| 8,070,093 | B2 | 12/2011 | Diochon et al. | |
| 8,226,028 | B2 | 7/2012 | Marche | |
| 8,336,812 | B2 | 12/2012 | Beaufort et al. | |
| 8,439,299 | B2 | 5/2013 | Luo et al. | |
| 8,474,751 | B2 | 7/2013 | Lebas et al. | |
| 8,496,202 | B2 | 7/2013 | Marche | |
| 8,905,368 | B2 * | 12/2014 | Zameroski | B64D 27/26 244/54 |
| 2004/0227033 | A1 * | 11/2004 | Picard | B64D 27/12 244/54 |
| 2009/0278021 | A1 | 11/2009 | Jimeno De La Torre | |
| 2010/0176239 | A1 * | 7/2010 | Marche | B64D 27/12 244/54 |
| 2012/0012732 | A1 * | 1/2012 | Zameroski | B64D 27/26 248/638 |
| 2012/0018575 | A1 | 1/2012 | Whiteford et al. | |

* cited by examiner

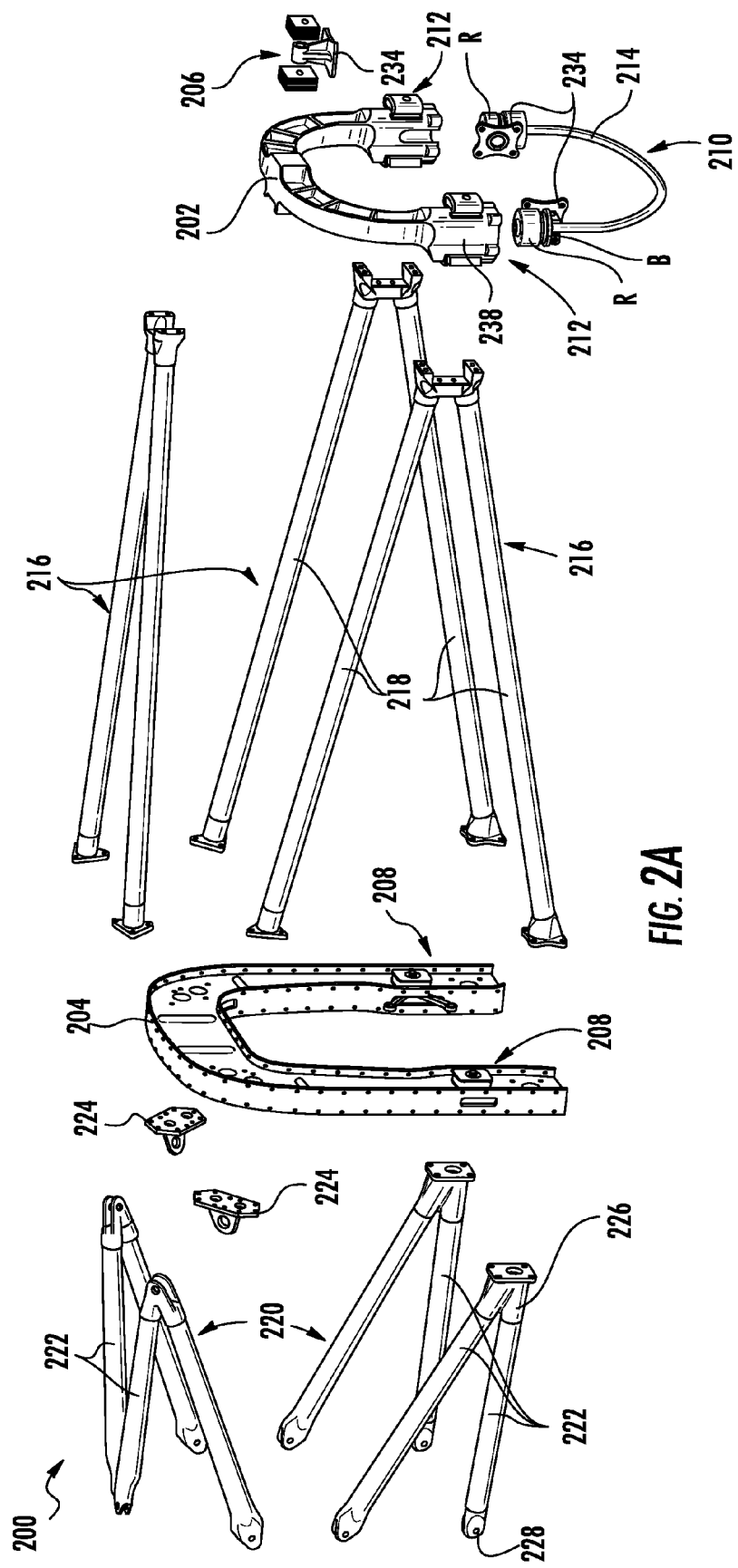

TURBOPROP ENGINE ATTACHMENT SYSTEMS AND METHODS

TECHNICAL FIELD

The subject matter herein relates generally to engine attachment systems and methods, and more specifically to improved turboprop engine attachment systems and methods.

BACKGROUND

In turboprop aircraft, the engines are typically mounted to attachment structures suspended from the respective aircraft wings or fuselage. Conventional attachment structures include complex rigid mounting bracket assemblies. Flexible isolators, which are separate from the attachment structure, are then distributed over a forward and/or rear frame to damp vibrations caused by the propeller and rotating equipment within the turboprop engine. Inspecting and/or replacing isolators used in conventional engine attachment systems may require the removal of the entire engine.

Manufacturers are constantly seeking ways to reduce the weight of the aircraft systems, while continuing to provide robust systems capable of accommodating severe operating conditions, including high temperatures and exposure to vibration.

Accordingly, a need exists for improved engine attachment systems and methods, which weigh less than conventional systems, require less materials (e.g., heat shielding), and improve the ease of installation, maintenance, and/or replacement of system components.

SUMMARY

Turboprop engine attachment systems and methods described herein utilize compliant attachments between an engine/gearbox and a nacelle-truss structure. The improved system includes a fully integrated attachment system, whereby the aft engine isolators, forward-top gearbox isolator, and a forward torque restraint (FTR) system are fully integrated within the forward and aft collar structures.

In some embodiments, an engine attachment system (EAS) includes a forward collar, an aft collar, at least one truss subassembly disposed between the forward collar and the aft collar for supporting an engine and at least one vibration isolator integrated with each of the forward and aft collars for isolating engine vibration and reducing noise.

A method of attaching a turboprop engine is also disclosed. The method includes providing an EAS including a forward collar, an aft collar, and at least one truss subassembly provided between the forward and aft collar for supporting an engine. At least one vibration isolator integrated with each of the forward and aft collars for isolating engine vibration and reducing noise. The method further includes hoisting a turboprop engine at least partially within the at least one truss subassembly.

BRIEF DESCRIPTION OF THE DRAWINGS

FIGS. 2A to 2C are various views of an Engine Attachment System (EAS), or components thereof, for use with a turboprop propulsion system according to the subject matter described herein.

DETAILED DESCRIPTION

Numerous objects and advantages of the subject matter will become apparent as the following detailed description of the preferred embodiments is read in conjunction with the drawings, which illustrate such embodiments. Reference is made in detail to the present embodiments of the subject matter, examples of which are illustrated in the accompanying drawings.

The subject matter described herein includes engine attachment systems (EASs) and related methods. In some embodiments, the EASs and related methods herein include isolators that are fully integrated with the forward and aft collars and/or mounts, which allow the isolators to be more easily attached in a simply-supported fashion as opposed to using a cantilevered design. Integrated and simply-supported isolators provide a more damage-tolerant system, which is also fully interlocking.

In some embodiments, the EASs and methods shown and described herein also provide a significant amount of weight savings in view of conventional designs, as much of the structure of the isolators is provided directly by the collar, and can therefore be eliminated. In addition, costly and weight intensive heat shielding materials can be reduced and/or obviated. For example, integrating isolators with the mounts takes advantage of the natural heat-shielding provided by the collar, thereby advantageously allowing elimination of additional heat-shielding which may otherwise be required. The weight savings also contributes to the provision of more fuel efficient aircraft, which in turn contributes to further savings in regards to labor and fuel expenses.

In further embodiments, the EASs and methods shown and described herein improve (e.g., simplify) ease of servicing, replacing, and/or maintaining the fully integrated isolators, as the forward and aft elastomeric elements can be independently inspected and independently removed, without requiring removal of the entire engine or propeller.

Figure 1A:
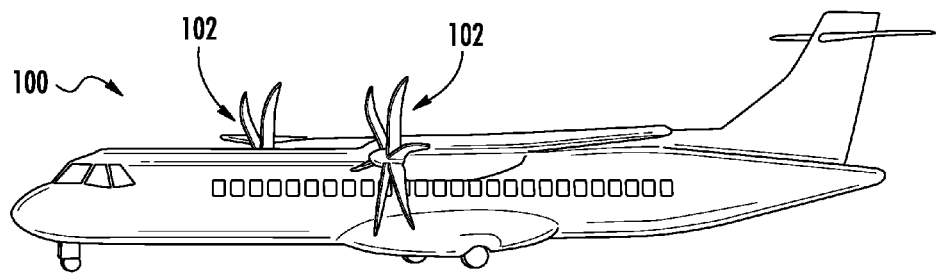
FIGS. 1A and 1B are perspective views of a turboprop propulsion system and turboprop aircraft, respectively, according to the subject matter described herein.
Figure 1B:
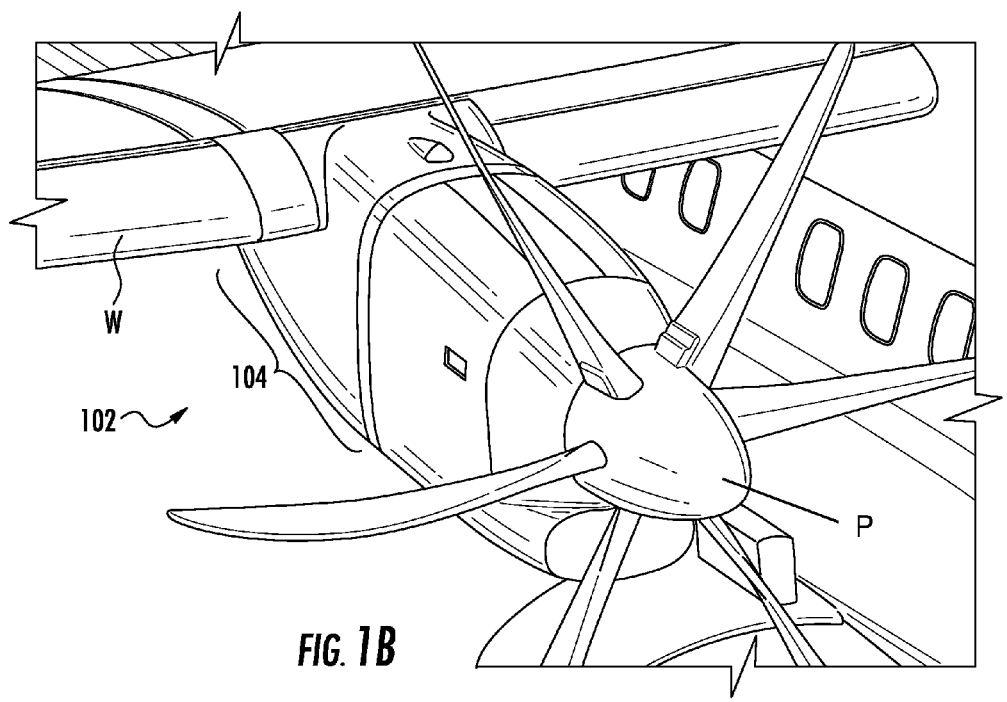

Referring now to FIGS. 1A and 1B, a turboprop aircraft, or portions thereof, are schematically illustrated. FIG. 1A illustrates a fixed wing, turboprop aircraft, which is generally designated 100. The aircraft includes a fuselage body propelled using one or more turboprop propulsion systems, generally designated 102. Each propulsion system 102 includes a turboprop engine and gearbox housed within a space provided via EASs and methods described herein, in which a nacelle-truss structure 104 houses and provides the connection between a turbine engine and wing. The turbine engine disposed within truss structure 104 is configured to drive an aircraft propeller for propelling the aircraft. EASs and methods described herein utilize fully integrated isolators and mounts for damping vibrations imparted to attachment structures by each aircraft engine and/or propeller. Aircraft 100 is merely exemplary in design, and may include any type or model of fixed wing turboprop aircraft, for example, not limited those having a particular horsepower (hp) engine class.

FIG. 1B illustrates a single propulsion system 102 attached to a respective wing of a fixed wing aircraft. Each wing of an aircraft can include a propulsion system 102 suspended therefrom. Propulsion system 102 houses an engine and gearbox and portions of the propeller (e.g., propeller flange and/or propeller shaft). EASs and methods described herein are adapted to more effectively secure the engine and gearbox of the propulsion system 102 between a fixed wing W of the aircraft and the propeller boss P. EASs and methods described herein advantageously reduce the weight of the system 102, improve the ease of maintaining and/or replacing system 102 components, and improve support of both the engine and gearbox provided within system 102.

Figure 2B:
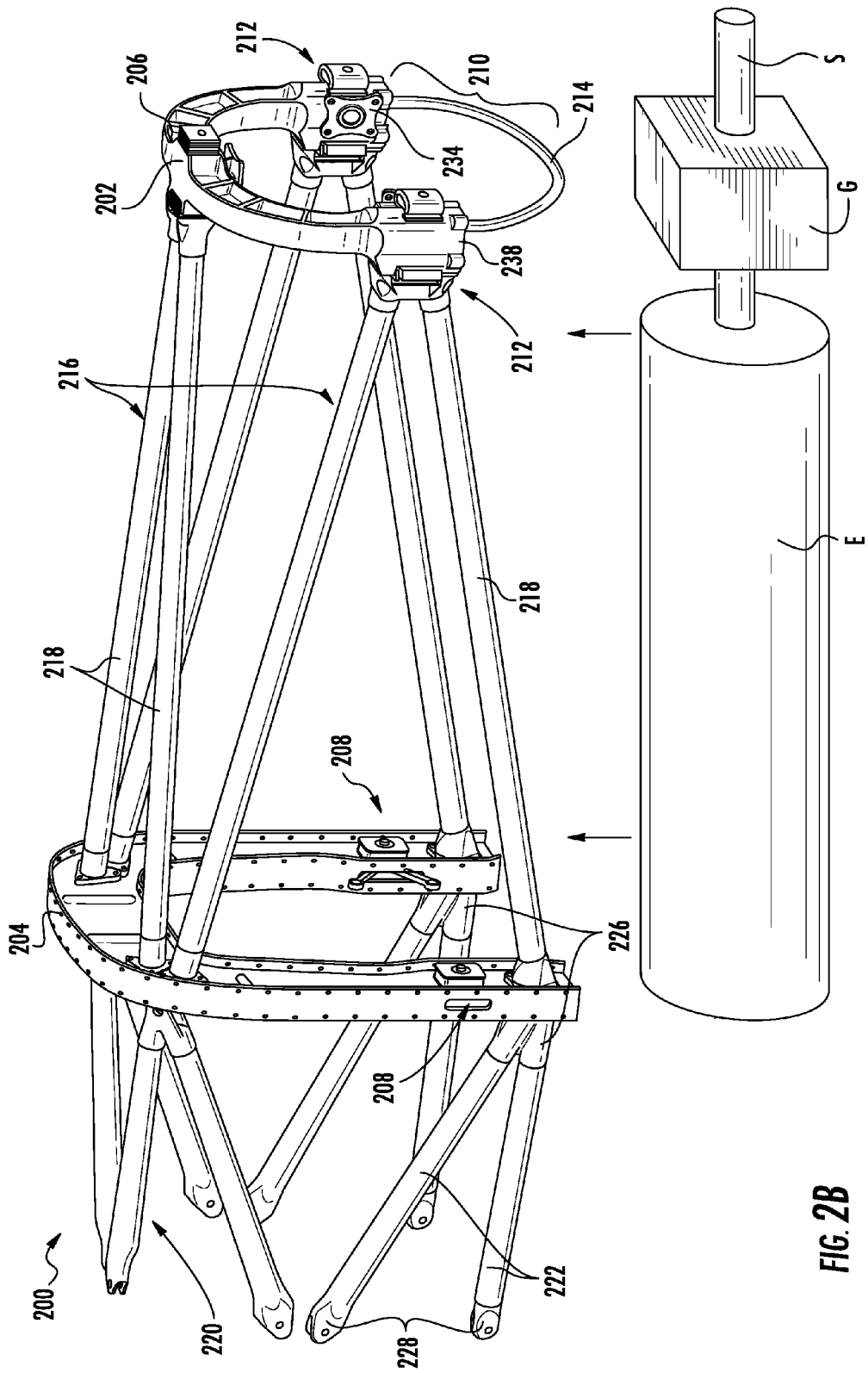

FIGS. 2A and 2B illustrate different views of one embodiment of an EAS, generally designated 200, according to embodiments of the present subject matter. EAS 200 includes an engine mount system (EMS) comprised of a plurality of mounting surfaces (e.g., 234, 246 FIGS. 3A to 4C) integrated with forward, aft, and side mount isolators (e.g., 206, 208, and 212), which are also integrated within one or more engine supports, including one or more collars.

In some embodiments, EAS 200 includes at least a first, forward collar 202 and a second (aft) mid-collar 204. Each collar 202 and 204 includes one or more fully integrated forward and aft mount isolators, respectively, disposed therein. Integrating isolators with each mount and collar provides a significant weight reduction to the overall EAS 200. In some embodiments, the majority of each collar 202 and 204, in terms of weight or mass, includes a metallic body member or structure, which provides a natural heat shield about each isolator. Thus, extraneous heat shielding materials disposed about each isolator can be reduced or eliminated.

In some embodiments, forward collar 202 includes at least one forward top mount isolator, generally designated 206, and a plurality of forward side mount isolators 212 integrated therewith. Forward collar 202 may include only one integrated isolator, two integrated isolators, or three or more integrated isolators, as shown. Mid (aft) collar 204 also includes one or more side or top aft mount isolators 208 integrated therewith. Each mount isolator (i.e., 206, 208, 212) includes a mounting surface for mounting to portions of a turboprop engine and/or gearbox, and an elastomeric isolator integrated therewith for damping vibration and/or offloading forces to portions of system 200. In some embodiments, the two opposing aft mount isolators 208 are disposed along opposing sides, surfaces, or legs of collar 204.

A forward torque restraint (FTR) assembly or system, generally designated 210, may also be integrated with portions of forward collar 202 in addition to mount isolators 212. In some embodiments, FTR 210 is a hydraulic torque reaction system which includes one or more fluid reservoirs R and respective bearings B which may be joined or connected via at least one fluid hose 214. In some embodiments, FTR system 210 includes a FLUIDLASTIC® system available from LORD Corp., headquartered in Cary, N.C. FTR system 210 is configured to isolate vibration and reduce noise generated by propulsion system (102, FIG. 1B). FTR system 210 may be dynamically tuned to provide further reduction in transmitted vibration of force at targeted frequencies.

Still referring to FIGS. 2A and 2B, system 200 further includes a plurality of struts provided in one or more truss or strut subassemblies. For example, system 200 includes a plurality of forward strut (truss) subassemblies, generally designated 216. Each forward strut subassembly 216 includes one or more individual struts 218 for forming a left truss subassembly, a right truss subassembly, and an upper truss subassembly which collectively support and/or retain an aircraft engine, gearbox, or portions thereof. Engine E, gearbox G, and propeller shaft S are schematically illustrated in FIG. 2B, as such structures are manufactured, provided, and hoisted into the space provided by system 200, and then mounted thereto and/or retained thereby. Engine E may be mounted to system 200 at one or more mounting surfaces or locations (e.g., 246, FIG. 4B) integrated with aft isolators 208. Gearbox G may be mounted to system 200 at mounting surfaces, for example, mounting members or plates 234 that are integrated with forward top isolator 206 and forward side isolators 212.

Each forward strut subassembly 216 is disposed between and/or attached to each collar 202 and 204 for providing load-path redundancy along the strut-to-collar interfaces that include welded, bracketed, jointed, fitted, and/or optionally heat treated structures. Individual struts 218 may include any material, not limited to steel, and may be welded to each other and/or end caps or fittings for simplifying assembly, shipping, "kitting" (e.g., boxing and shipping components), and replicability/serviceability aspects. Struts 218, or portions thereof, may include hollow, metallic tube with optionally tapered end portions formed using any suitable process, for example, via swaging and/or die-forming end portions thereof. Struts 218 may also be hydro-formed or flow-formed and then welded as described further below in regards to FIGS. 6A and 6B. Struts 218 may include any suitable material formed using any suitable processing technique, where desired.

System 200 further includes a plurality of mid strut (truss) subassemblies, generally designated 220. Each mid truss subassembly 220 includes one or more individual airframe struts 222 for forming a mid upper truss subassembly and two or more mid lower truss subassemblies. Portions of each subassembly 220 are configured to connect EAS 200 to a fixed wing (e.g., W, FIG. 1B) of an aircraft. Other portions of each subassembly 220 are configured to connect to mid collar 204 via welding and/or to one or more optional brackets 224 and/or fittings 226. Although not shown, more than two collars and more than two sets of strut/truss subassemblies may be provided per system 200 where desired, for accommodating larger engines and/or gearboxes, or to extend attachment to aft wing spar.

Subassemblies 216 and 220 of EAS 200 illustrated in FIGS. 2A and 2B are relatively small from a packaging and handling standpoint. This not only allows the structures to be shipped and installed easier, but also allows for various items to be removed and replaced if they were to be accidently damaged in the field. It is expected that the final build-up/installation of the strut structures is performed either by the supplier or the airframer.

In some embodiments, each subassembly 220 includes a low profile having substantially planar struts 222 for improved kitting and simpler jigging or fixturing during welding. In some embodiments, subassembly 220 is welded to one of more end caps or fittings. For example, one end of each strut 222 may be welded to a first fitting 226, and an opposing end of each strut 222 may be welded to a second fitting 228. First fitting 226 is configured to attach to mid collar 204 via one or more mechanical fasteners (e.g., bolts, pins, screws, etc.). First fitting 226 may be provided via forging, machining, casting, extruding, and/or any other suitable process. Second fitting 228 is configured to mount or attach to a fixed wing (e.g., W, FIG. 1B) of an aircraft, such that system 200 is suspended and/or mounted below the fixed wing (e.g., W, FIG. 1B) thereby supporting and/or retaining the aircraft engine E and gearbox G (FIG. 2B).

In some embodiments, second fitting 228 of each strut 222 includes a clevis end. Each strut 222 may be welded or otherwise connected or attached to second fitting 228. Strut 222 may include a hollow metallic tube or body member having a constant diameter and/or a constant wall thickness. The clevis-style attachment of second fitting 228 is mounted to and/or disposed proximate an airframe (e.g., of wing, W, FIG. 1B) which allows strut 222 to be bolted to the wing connection points in the form of revolute or structural joints.

In some embodiments, second fitting 228 is machined to a substantially straight (e.g., constant diameter) strut 222 for providing improved design freedom and versatility. Second fitting 228 may be machined as a clevis or optionally as a lug, where desired. Studies have shown that moment-carrying through many of the strut connections, as opposed to spherical or revolute joints, is necessary to maintain a level of structural stiffness and redundancy that is necessary for the installation. To that end, the structure of EAS 200 is designed using either welded or bolted connections at most locations. One exception is the aft upper truss subassemblies which are ultimately attached to aft collar 204 through a spherical connection or bearing within bracket 224. This allows for free pivoting and ease of installation on the aircraft. However, once installed on the aircraft, this portion of the truss becomes rigid.

One end of each strut 222 affixes to the aircraft wing W (FIG. 1B) or aft truss assembly (not shown) and is removable. Therefore, the attachment at the eight interface locations (e.g., at eight airframe struts 222) utilizes a bolted approach as opposed to welding.

In some embodiments, each end of struts 222 include clevis style attachments (e.g., fitting 228) that are formed. That is, forming devices can be used to produce the integral clevis style fitting 228 on a straight or flow-formed (e.g., variable wall thickness) tube. Swaging is one forming and/or forging process in which the dimensions of an item are altered using dies into which the item is forced. Swaging is usually a cold working process; however, it is sometimes done as a hot working process. Swaging allows formation of the clevis into the tube itself. The end fitting 228 of the clevis style attachment can be manufactured by more traditional machining, casting, and/or forging methods, or welded on as a separate detail.

As FIGS. 2A and 2B collectively illustrate, fluid reservoir R portions of FTR system 210 may be installed within a portion of collar 202 and/or collar fitting 238 as shown. In some embodiments, collar 202 and/or collar fitting 238 are counter-bored for providing a substantially flat landing surface on the inside. Each fluid reservoir R can thus rest against the landing surface and be tightened, in some aspects via optional end cap plates (not shown). This attachment scheme provides a clean (direct) load-path by which torque and vertical loads enter and/or transfer into collar 202 and struts 218. During engine installation, FTR system 210 may be attached to the gearbox G (FIG. 2B) prior to assembling reservoir R portions to collar 202. Forward and aft elastomeric packs (e.g., 230, 232, FIG. 2C) can then be installed, for example, by sliding the packs into position after the respective fluid reservoirs R are installed. Thus, each forward isolator 212 is slidable with respect to collar 202.

A mounting surface, such as a mounting plate or flange member 234, may be connected to the portions of each fluid reservoir R and respective piston via a high-capacity laminate or high capacity laminate (HCL) bearing B. Bearing B provides extremely high stiffness connection to the fluid system, but very low stiffness in the shear directions. This allows flange member 234 to move freely in the lateral and fore/aft directions so the forward and aft elastomeric elements (e.g., 230, 232, FIG. 2C) of isolators 212 provide stiffness in those directions.

In some embodiments, portions of gearbox G are configured to mount to system 200 via flange member 234, which includes integral isolators 212. Gearbox G can be mounted to and/or retained via flange member 234 integrated with isolators 212 for damping vibration and reducing noise proximate the source of the vibration and noise.

Replacement of FTR system 210 without engine removal is made possible by removal of the thrust packages (e.g., 230, 232, FIG. 3C) and lateral movement of the engine to allow disengagement of the gearbox mount pad. FTR system 210 can then be removed from collar 202. However, it is recommended that the engine weight be supported by a jack or an overhead hoist during this procedure.

During engine installation within EAS system 200, engine E and gearbox G may be hoisted vertically into position within the engine truss structure and subassemblies 216, 220, as indicated by the arrows. Before being lifted, the forward gearbox flange members 234 and FTR system 210 may be installed onto gearbox G. The hose 214 can be tied-up (connected) to the gearbox G via p-clamps, or any other suitable connector or connecting structure. Once engine E is hoisted into position, the forward and aft elastomeric elements (e.g., 230, 232, FIG. 3A) can be installed at all forward mount locations, including forward isolator 206, 212 positions.

Figure 2C:
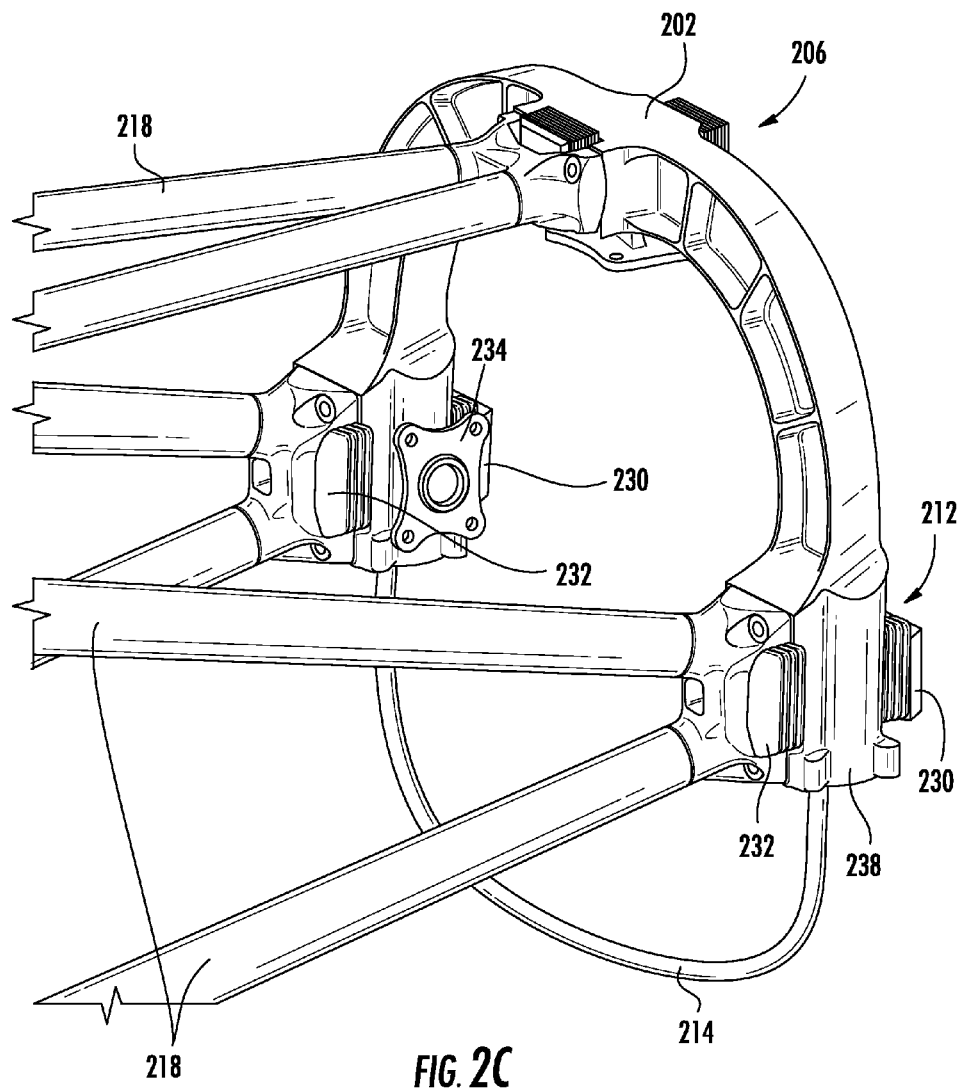

FIG. 2C is a rear view of forward collar 202, struts 218, and FTR system 210. In some embodiments, forward collar 202 includes a single, discrete body of material in which weld joints are eliminated. This improves the ease of manufacture by reducing extraneous materials, components, and/or assembly steps. In some embodiments, collar 202 is forged from any material not limited to steel, and may be optionally hardened, surface treated, finished, machined and/or heat treated. Collar 202 may include any suitable U-shaped member, and may include additional non-forged embodiments (see e.g., FIG. 5), where desired. In some embodiments, a complementary U-shaped collar may be installed on the lower half to close the connection for improved stiffness and redundancy, where desired.

As noted above and in some embodiments, FTR system 210 includes and/or incorporates FLUIDLASTIC® technology available from LORD, Corp. Elastomeric isolators 212 include forward elastomeric elements 230 and aft elastomeric elements 232, which when used in combination with a sealed fluid (e.g., in reservoirs R, FIGS. 2A and 2B), allows for a wide range of noise and vibration isolation. Metallic shims may be disposed between elastomeric sections of elements 230 and 232. FTR system 210 is configured to minimize noise and vibration near the source, so that the amount of sound damping material typically required in the cabin or airframe may be reduced. This results in a further reduction in weight and a greater vibration damping range and efficiency. FTR system 210 can improve vibration and noise isolation significantly while reducing isolator weight by approximately 30% or more when compared to conventional torque tube type of systems.

In some embodiments, FTR system 210 is configured to decrease vibration at high torque loads and limit torsional deflections. FTR system 210 provides torque reaction through a state of hydraulic or 'hydrostatic' fluid compression between two side forward isolators 212. FTR system 210 eliminates the need for a torque-tube and associated hardware, resulting in a significant weight reduction of propulsion system (e.g., 102, FIG. 1B) and airframe (e.g., 100, FIG. 1A).

In some embodiments, FTR system 210 utilizes a high-pressure, braided fluid hose 214 connected between two volume chambers or reservoirs R of the two forward side mount isolators 212. As the engine is torqued, the fluid is compressed within both isolator reservoirs R and hose 214. This state of hydrostatic compression provides a high effective stiffness to react the torsional load. In some embodiments, FTR system 210 is totally sealed and devoid of sliding seals. The elastomer section can be used to provide the sealing. Thus, FTR system 210 is advantageously "service-free" meaning system 210 does not require accumulators, fill-ports, inspections, and/or re-fills.

Figure 3A:
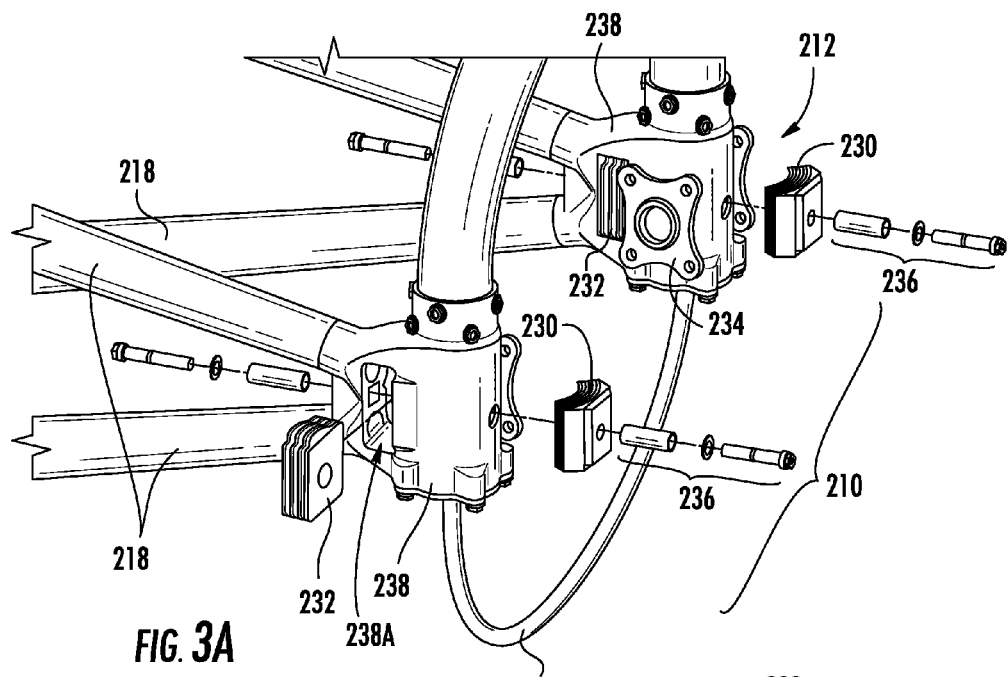
FIGS. 3A and 3B are views of integrated forward isolators according to the subject matter described herein.
Figure 3B:
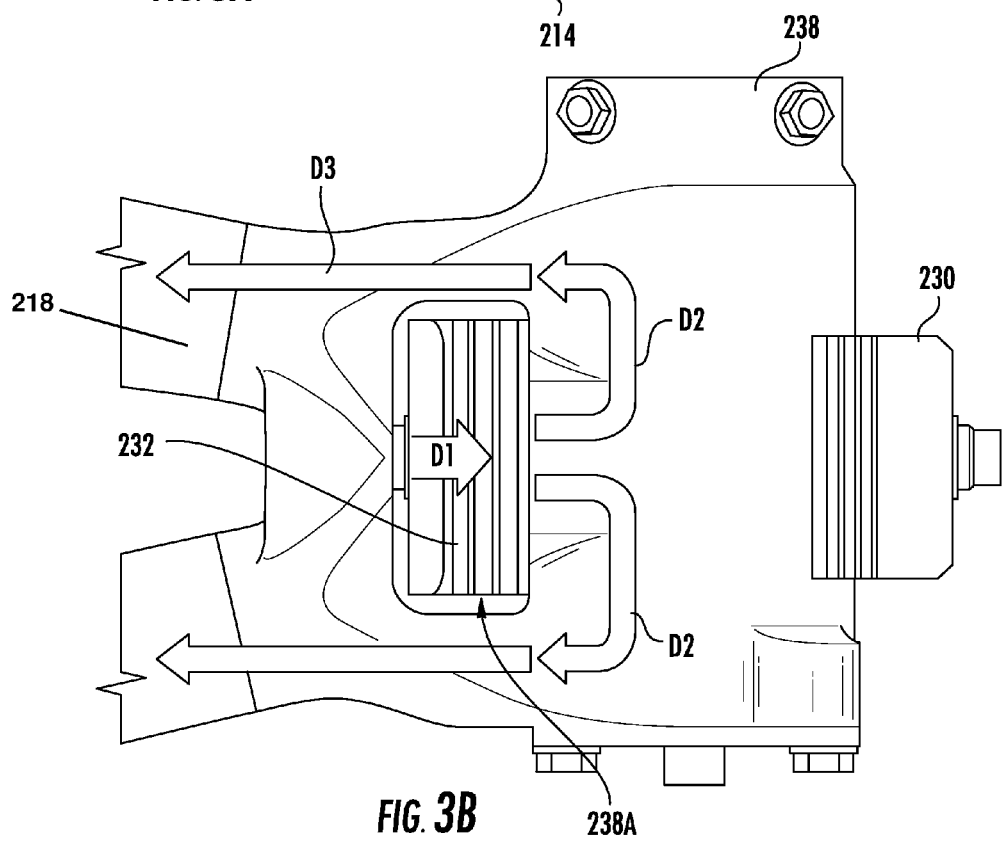

FIGS. 3A and 3B illustrate aspects of forward side mounts and isolators 212 of FTR system 210. Isolators 212 are packaged within the frame structure (e.g., collar 202), in some aspects. This not only provides a design that is more manufacturable with lightweight isolators, but also allows a system that can tolerate higher pressures at the significantly reduced weight. Essentially, what would normally have been the housing of the isolator is now provided by forward collar 202. This eliminates the need for typical cantilevered attachment methods, and incorporates isolators 212 in a simply supported fashion within collar 202. This reduces the weight of the attachment hardware and provides a system that is much more interlocking and failsafe.

Referring to FIG. 3A, FTR isolators, including forward side isolators 212, are designed to provide controlled stiffness in three degrees of freedom; fore/aft, lateral, and vertical via elastomeric elements 230, 232 and FTR system 210. The fore/aft and lateral stiffness is provided by compression and shear of forward elastomeric elements 230 and aft elastomeric elements 232. Elastomeric elements 230 and 232 include a laminate structure having a plurality of alternating elastomeric and metallic layers. In some embodiments, the vertical and torque stiffness is provided by shear of the elastomer sections, as well as hydrostatic compression of the fluid within a fluid reservoir (e.g., R, FIG. 2A).

In some embodiments, elastomeric elements 230 and 232 include metallic shims layered with elastomer, the shims being formed from corrosion resistant steels, aluminum, or titanium. Most of the major metallic components and associated hardware 236 may also include corrosion resistant steels or titanium. Elastomeric portions of elements 230 and 232 include a natural or synthetic rubber blend for maximum strength and fatigue resistance. The interlocking nature of flange member 234, hardware 236, and collar 202 provides a redundant load-path should the elastomer become burned-away during a fire. In some embodiments, a gearbox (e.g., G, FIG. 2B) is hoisted into and retained within system 200, for example, between opposing flange members 234.

In some embodiments, isolators 212 include hard-contact snubbing features or nonlinear stiffness elements which are used to prevent excessive deflections under extreme loading conditions. Additionally, isolators 212 utilize an inherent interlocking scheme having a metallic structure around an elastomer, which provides a secondary load-path to fully support load under fire conditions, assuming the elastomer is burned away.

In some embodiments, each aft elastomeric element 232 of the forward mounts is installed from the side with regard to collar 202, and is received within an aperture or receiving space 238A of a collar fitting 238 structure which couples forward struts 218 to forward collar 202. Installing elastomeric elements 232 from the side provides a design that is fully interlocking and fully protected. Hardware 236 including bolts, washers, and/or spacer sleeves lock forward and aft elastomeric elements 230 and 232, respectively, within system 200. Installation and wrenching holes are provided between and/or within portions of forward struts 218 and/or collar 202 for integrating isolators 212 and FTR system 210.

FIG. 3B is a sectional view of a portion of FTR system 210, which schematically illustrates the load distribution or load-path of torque and vertical loads through collar 202, collar fitting 238 and struts 218 in response to thrust loads. As FIG. 3B illustrates, a thrust load in direction D1 is generated during flight. The thrust load is distributed to collar 202 (e.g., via collar fitting 238) and struts 218 along a load path illustrated by arrows having directions D2 and D3. This provides a clean (direct) load-path for efficiently distributing torque and vertical loads during flight, without requiring torque tubes or other hardware/systems which may add additional weight.

In some embodiments, isolators 212 differ from conventional systems in that the fore and aft elastomeric elements 230 and 232, respectively, are stand-alone components which are located on the outside of the mount or mounting surface 234. Not only does this allow elastomeric elements 230 and 232 to be more easily inspected and replaced, but it also allows the option to use materials having a different rubber modulus in each for optimizing stiffness and tuning. Metallic shims are optionally introduced into the elastomer elements to provide varying stiffness in each direction as needed.

The method of connection between flange member 234 and elastomeric elements 230 and 232 is designed such that the aft elastomeric element 232 carries the majority of the forward-thrust load D1, as illustrated in FIG. 3B. This is beneficial as that particular element (e.g., 232) is optimally located between struts 218 and collar 202, and provides a very clean load-path into struts 218. The design is such that portions of forward and aft elastomer elements 230 and 232, respectively, are connected to flange member 234 via hardware 236 such as spacer sleeves, washers, and associated bolts. Thus, when flange member 234, which is connected to gearbox G (FIG. 2B), translates forward under thrust, aft elastomeric element 232 becomes loaded in compression.

Figure 4A:
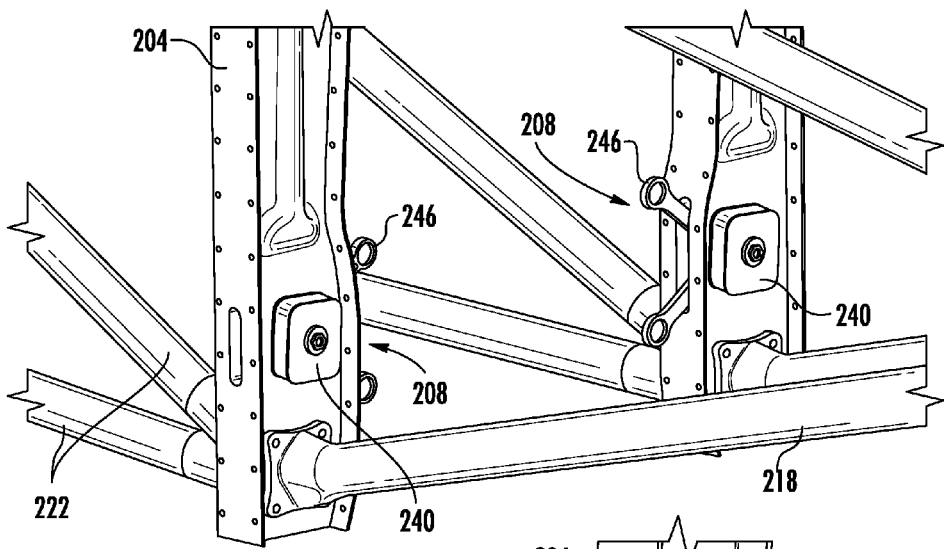
FIGS. 4A to 4C are views of integrated aft isolators according to the subject matter described herein.
Figure 4C:
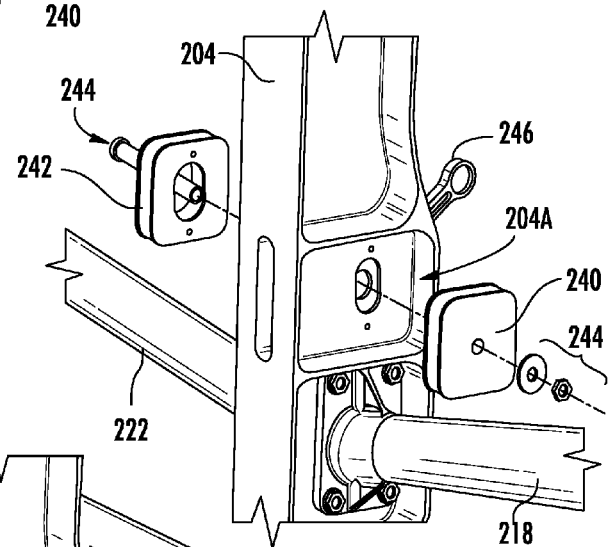
Figure 4B:
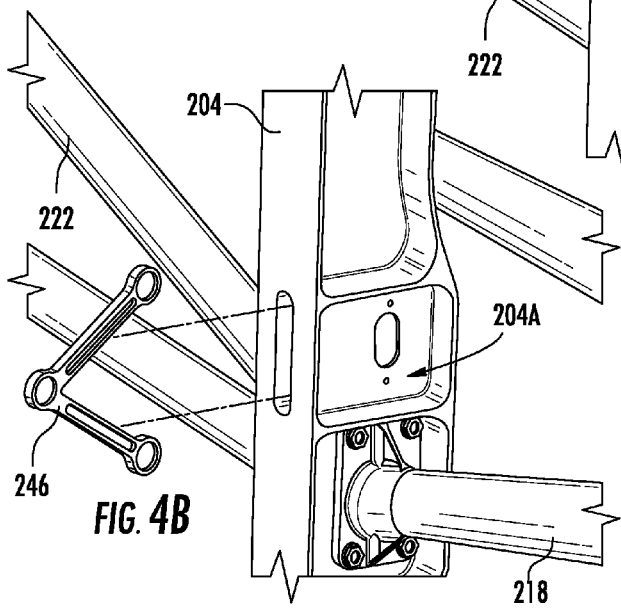

FIGS. 4A to 4C are various views of aft collar 204, at least a portion of which is integrated with one or more engine mounts and vibration isolating devices or isolators 208. In some embodiments, isolators 208 are received and/or disposed in recessed portions collar 204, on opposing legs of collar 204. Isolators 208 include a front isolating member 240 and an aft isolating member 242 for isolating vibration and reducing noise of turboprop engine (e.g., E, FIG. 2B). Isolating members 240 and 242 may be affixed to collar 204 via hardware 244, such as spacer sleeves, bolts and/or pins. Portions of isolating members 240 and 242 may include elastomeric elements disposed between metallic shims, similar to elements 230 and 232 described above.

In some embodiments, isolators 208 are configured to isolate and reduce engine noise and/or vibration at the source of the vibration, proximate locations where the engine is mounted. In some embodiments, aft collar 204 is provided or disposed around (about) portions of an engine combustor, and is mostly outside of a rotor-burst zone. This improves safety and reliability of EAS 200. Isolators 208 may be installed after engine (e.g., E, FIG. 2B) is hoisted into place.

In some embodiments, portions of a turboprop engine (e.g., schematically illustrated E, FIG. 2B) are secured via portions of one or more top or side aft mount isolators 208.

For example, each isolator 208 is integrated with a mounting surface, for example, a retaining member 246. Retaining member 246 is configured to slide into a side aperture or side portion of collar 204, and extend therefrom. For example and as FIG. 4B illustrates, retaining member 246 may include a scissor link that is configured to collapse for inserting within the pocket or aperture of collar 204. Engine (e.g., E, FIG. 2B), or portions thereof, are configured to bolt, or otherwise mount to system 200, and be fixedly held thereto via retaining members 246. Isolators 208 are configured to isolate vibration and reduce noise generated at locations where the engine (e.g., E, FIG. 2B) mounts to system 200.

As FIGS. 4A to 4C collectively illustrate, aft isolators 208 are heavily integrated within aft collar 204. This provides many benefits for system 200. First, it allows aft collar 204 to be made narrower than if the mounts (e.g., 246) were flange mounted on the inside surface. Second, it eliminates the inner-member of the isolator as the elastomeric elements can interface directly with the collar 204. This, along with the elimination of several bolts, saves a significant amount of weight from the assembly. Third, as the aft mounts are located next to a very hot section of the engine case, heating the isolator would typically be a concern. However, the improved design incorporates integrated aft isolator(s) 208 within collar 204 so that each isolator 208 is naturally shielded from radiant heat by the I-beam webs of the aft collar 204. This reduces or eliminates the need for any additional heat shielding.

Figure 5:
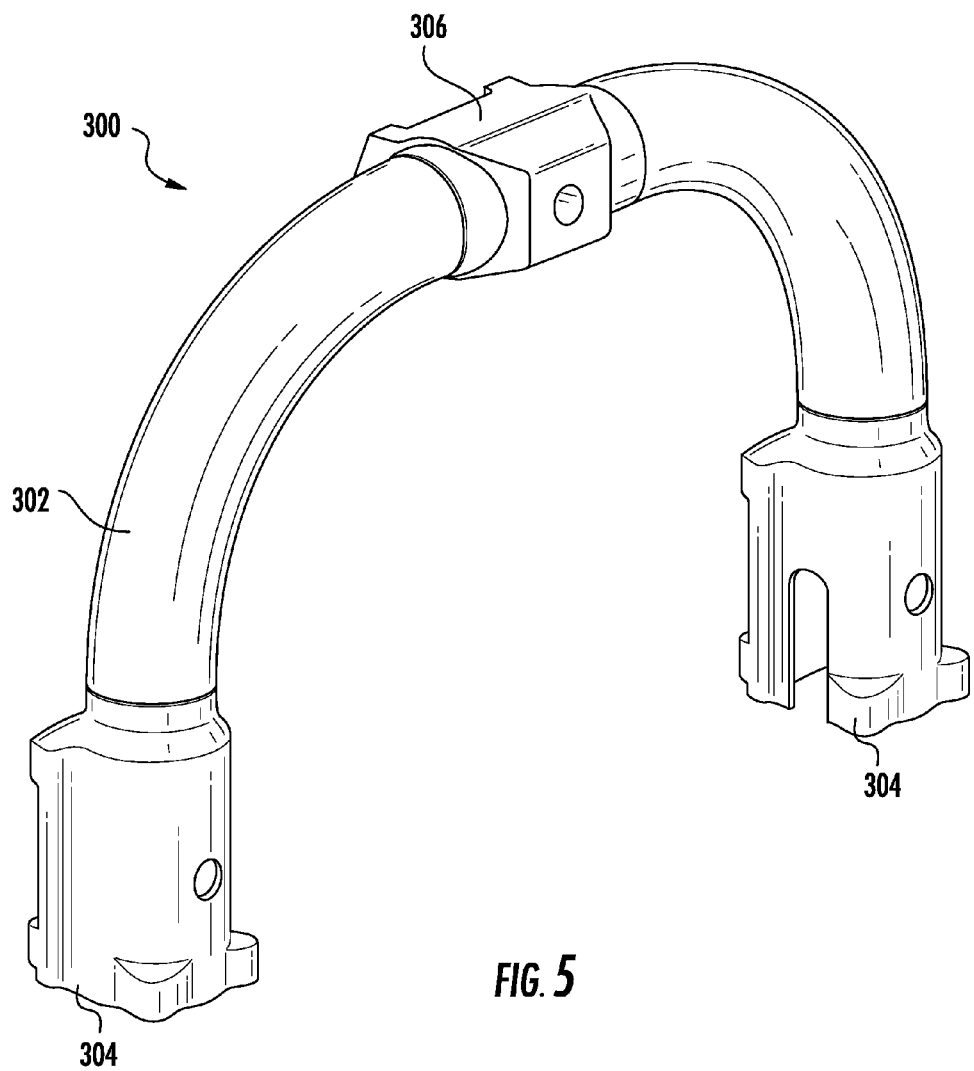
FIG. 5 is an alternative embodiment of a forward collar according to the subject matter described herein.

FIG. 5 illustrates an alternate embodiment of a forward collar, generally designated 300. As described in FIGS. 2A and 2B, in some embodiments forward collar (e.g., 202) is forged from a single discrete body of material. In other embodiments, forward collar 300 is non-forged, and includes a bent tube that is welded to one or more fittings. For example, in some embodiments, collar 300 includes a hollow (tube) metallic body 302, which offers additional weight savings. Body 302 may be bent and welded to multiple end fittings 304 and a top fitting 306. Fittings 306 are configured to retain and/or receive portions of one or more isolators having mounting surfaces and/or struts. This embodiment may be used across multiple platforms. Fittings 304 and 306 may be machined, forged, extruded, or otherwise provided.

Figure 6A:
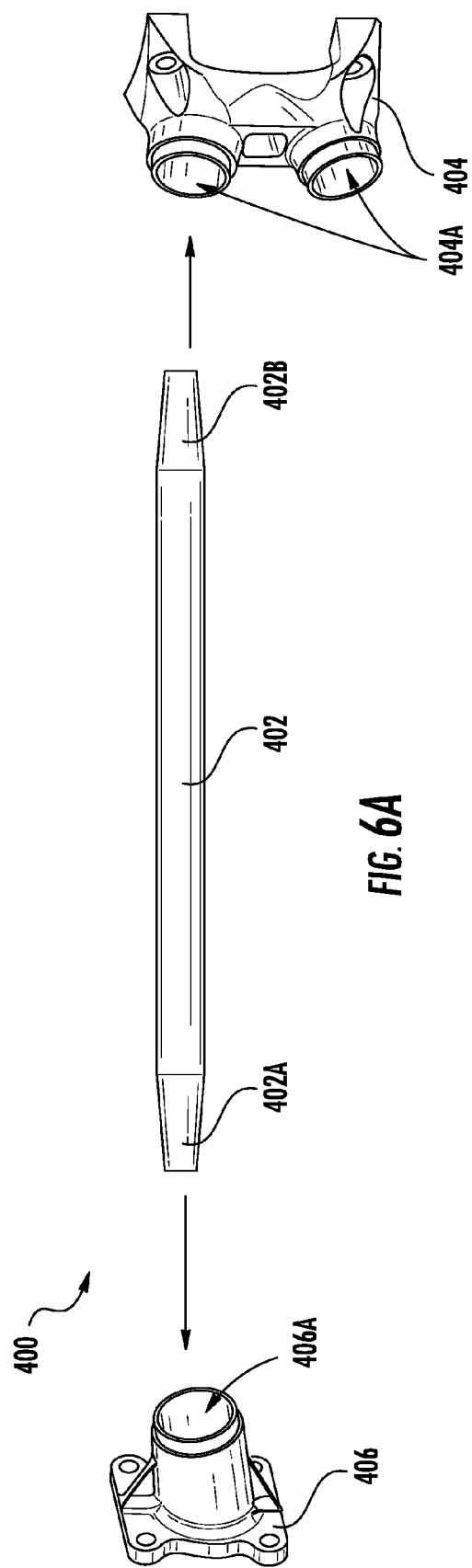
FIGS. 6A and 6B are embodiments of forward struts according to the subject matter described herein.
Figure 6B:
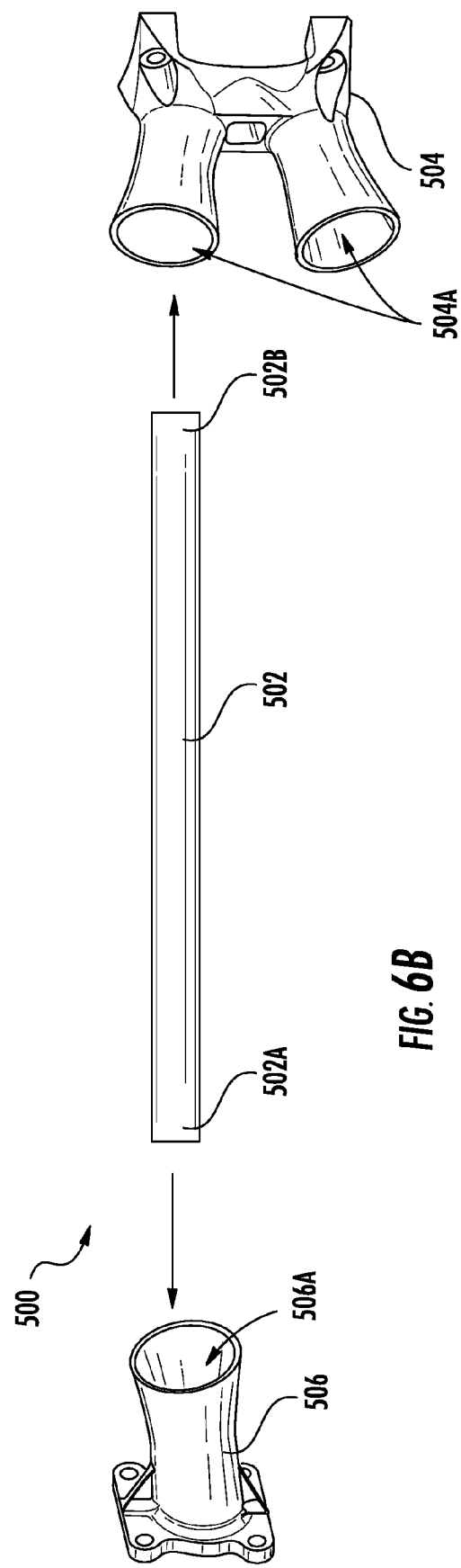

FIGS. 6A and 6B illustrate various embodiments of forward strut subassemblies (e.g., 216, FIG. 2A). Each subassembly forms portion of a truss frame structure that is configured to support portions of the engine and/or gearbox, and can include one or more truss frame struts. A plurality of struts (e.g., 218, FIG. 2A) can be provided per system, in some embodiments at least six truss frame struts are provided. FIGS. 6A and 6B illustrate a single strut and fittings, for illustration purposes.

Referring now to FIG. 6A, a first embodiment of a truss frame structure 400 is illustrated. Trust frame structure 400 includes one or more truss frame struts 402, which may be welded, or otherwise joined, to form a forward upper truss subassembly, a forward right truss subassembly, and a forward left truss subassembly (e.g., see FIGS. 2A and 2B). In some embodiments, one end of each truss frame strut 402 is welded to a first fitting 404, which is configured to bolt or otherwise mount to portions of forward collar (e.g., 202, FIG. 2A). A second end of each truss frame strut 402 is welded to a second fitting 406, which is configured to bolt or otherwise mount to portions of aft collar (e.g., 204, FIG. 2A).

In some embodiments, at least a portion of each strut 402 is tapered, for example, one or more ends 402A and 402B may be tapered. In some embodiments, ends 402A and 402B of struts 402 are swaged, "die-formed", or hydro-formed. This is a low cost technique that maximizes bending stiffness, and allows smaller fittings to be used. Smaller fittings equates to less machining and cost, in addition to weight savings. Each end 402A and 402B is received within an opening 404A of first fitting 404 and a second opening 406A of second fitting 406 and welded thereto.

Using swaged or formed tubes within truss structure 400 provides a tapered tube whereby the diameter can be increased in the center for improved buckling resistance and bending stiffness. At the same time, it advantageously provides thinner wall in the center per approximately a uniform cross-sectional area approach. This is more optimal and/or improved from a weight standpoint.

In other embodiments, strut 402 includes a flow-formed tube having tapered ends 402A and 402B. Flow-forming is a technique whereby a 'blank' of material is cold-worked or rolled out over a mandrel. This process improves the ease of manufacture of tubes having varying wall thicknesses, especially if the tube is of a constant inside-diameter.

Referring now to FIG. 6B, another embodiment of a truss frame 500 is illustrated. Truss frame structure 500 includes one or more truss frame struts 502, which may be welded, or otherwise joined, to form a forward upper truss subassembly, a forward right truss subassembly, and a forward left truss subassembly (e.g., see FIGS. 2A and 2B). In some embodiments, one end of each truss frame strut 502 is welded to a first fitting 504, which is configured to bolt or otherwise mount to portions of forward collar (e.g., 202, FIG. 2A). A second end of each truss frame strut 502 is welded to a second fitting 506, which is configured to bolt or otherwise mount to portions of aft collar (e.g., 204, FIG. 2A).

In some embodiments and in contrast to tapered struts, strut 502 includes a tube having a constant diameter. Openings 504A and 506A of respective fittings are tapered to accommodate strut 502. Tapered fittings may advantageously obviate the need to taper individual struts 502, which saves time and optimizes cross-sectional properties for improved strength and/or stiffness.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

We claim:

1. An engine attachment system (EAS) comprising:
   a forward collar;
   an aft collar;
   at least one truss subassembly disposed between the forward collar and the aft collar for supporting an engine; and
   at least one vibration isolator integrated within each of the forward and aft collars for isolating engine vibration and reducing noise, wherein the at least one vibration isolator includes forward and aft elastomeric elements disposed about a fluid reservoir.

2. The EAS of claim 1, wherein the forward and aft elastomeric elements are slidable with respect to the forward collar.

3. The EAS of claim 1, wherein at least three vibration isolators are integrated within the forward collar.

4. The EAS of claim 1, wherein at least two vibration isolators are integrated within the aft collar.

5. The EAS of claim 1, wherein the at least one vibration isolator interlocks about portions of each of the forward and aft collars.

6. The EAS of claim 1, wherein forward and aft elastomeric packs are independently removable from the EAS without requiring removal of the engine.

7. The EAS of claim 1, further comprising a plurality of airframe struts extending from the aft collar for attaching the EAS to an airframe of an aircraft, wherein the struts include clevis style attachments on at least one end.

8. The EAS of claim 1, further comprising an integrated forward torque restraint (FTR) system for hydrostatic compression of a fluid for reacting to torsional loads.

9. The EAS of claim 1, further comprising one or more hydro-formed struts or trusses.

10. The EAS of claim 1, further comprising one or more flow-formed struts or trusses.

11. A method of attaching a turboprop engine, the method comprising:
   providing an engine attachment system (EAS) comprising:
      a forward collar;
      an aft collar; and
      at least one truss subassembly provided between the forward and aft collar for supporting an engine; and
      at least one vibration isolator integrated within each of the forward and aft collars for isolating engine vibration and reducing noise; and
   hoisting a turboprop engine at least partially within the at least one truss subassembly.

12. The method of claim 11, wherein providing the EAS comprises providing at least one vibration isolator having forward and aft elastomeric elements disposed about a fluid reservoir and piston.

13. The method of claim 12, wherein the forward and aft elastomeric elements are slidable with respect to the forward collar.

14. The method of claim 11, wherein providing the EAS comprises providing at least three vibration isolators integrated within the forward collar.

15. The method of claim 11, wherein providing the EAS comprises providing at least two vibration isolators integrated within the aft collar.

16. The method of claim 11, wherein providing the EAS comprises locking forward and aft vibration isolators about portions of the forward and aft collars, respectively.

17. The method of claim 11, further comprising bolting airframe struts of the EAS to an airframe of an aircraft, wherein the struts include integral clevis style attachments on at least one end.

18. The method of claim 17, wherein the struts are hydro-formed or flow-formed tubes.

19. The method of claim 17, wherein the clevis style attachments are swaged.

20. The method of claim 11, further comprising providing a forward torque restraint (FTR) system on the forward collar for hydrostatic compression of a fluid for reacting to torsional loads.

* * * * *